(12) United States Patent
Heo et al.

(10) Patent No.: US 8,995,241 B1
(45) Date of Patent: Mar. 31, 2015

(54) APPARATUS FOR DRIVING VOICE COIL MOTOR ACTUATOR

(71) Applicants: Samsung Electro-Mechanics Co., Ltd., Gyeonggi-Do (KR); Zinitix Co., Ltd., Gyeonggi-do (KR)

(72) Inventors: Hoon Heo, Gyeonggi-Do (KR); Hee Soo Yoon, Gyeonggi-Do (KR); Seog Jin Hong, Gyeonggi-Do (KR); Won Seob Oh, Gyeonggi-Do (KR); Kyoung Won Hyun, Gyeonggi-Do (KR); Shin Young Cheong, Gyeonggi-Do (KR); Ga Eun Kang, Gyeonggi-Do (KR); Sung Sig Kim, Gyeonggi-Do (KR); Yong Joon Park, Gyeonggi-Do (KR)

(73) Assignees: Samsung Electro-Mechanics Co., Ltd., Gyeonggi-Do (KR); Zinitix Co., Ltd., Gyeonggi-Do (KR)

( * ) Notice: Subject to any disclaimer, the term of this patent is extended or adjusted under 35 U.S.C. 154(b) by 0 days.

(21) Appl. No.: 14/461,839

(22) Filed: Aug. 18, 2014

(30) Foreign Application Priority Data

Apr. 16, 2014 (KR) ........................ 10-2014-0045591

(51) Int. Cl.
*G11B 7/00* (2006.01)
*G02B 7/02* (2006.01)
*G11B 7/09* (2006.01)

(52) U.S. Cl.
CPC .............. *G02B 7/023* (2013.01); *G11B 7/0935* (2013.01)
USPC ......................... 369/44.14; 359/822; 359/557

(58) Field of Classification Search
None
See application file for complete search history.

(56) References Cited

U.S. PATENT DOCUMENTS

| 4,731,579 A * | 3/1988 | Petersen et al. ............... 396/463 |
| 4,868,802 A * | 9/1989 | Kobori ........................ 369/44.14 |
| 2006/0127074 A1* | 6/2006 | Noji ................................. 396/55 |
| 2008/0291540 A1* | 11/2008 | Nakamura et al. ............ 359/554 |
| 2009/0185300 A1* | 7/2009 | Iida .............................. 359/826 |
| 2010/0053784 A1* | 3/2010 | Kang et al. .................... 359/824 |
| 2011/0317266 A1* | 12/2011 | Miyamori et al. ............ 359/557 |
| 2012/0229927 A1* | 9/2012 | Ohishi et al. ................. 359/826 |
| 2013/0163085 A1* | 6/2013 | Lim et al. ..................... 359/557 |
| 2013/0170039 A1* | 7/2013 | Miyoshi ........................ 359/554 |
| 2013/0202280 A1* | 8/2013 | SHIMOHATA et al. ....... 396/55 |

FOREIGN PATENT DOCUMENTS

JP 2013-083597 A 5/2013

* cited by examiner

*Primary Examiner* — Thang Tran
(74) *Attorney, Agent, or Firm* — Bracewell & Giuliani LLP; Brad Y. Chin (57) ABSTRACT

Embodiments of the invention provide an apparatus for driving a voice coil motor actuator providing a driving signal to a coil for controlling a position of a lens barrel in which a magnet is equipped. The apparatus includes a plurality of hall sensors configured to detect the position of the lens barrel in which the magnet is equipped, and a voice coil motor driving integrated circuit configured to provide the driving signal to the coil based on outputs from the plurality of hall sensors and a received target position. The plurality of hall sensors are embedded in the voice coil motor driving integrated circuit along a moving direction of the magnet.

14 Claims, 4 Drawing Sheets

APPARATUS FOR DRIVING VOICE COIL MOTOR ACTUATOR

CROSS REFERENCE TO RELATED APPLICATION

This application claims the benefit of and priority under 35 U.S.C. §119 to Korean Patent Application No. KR 10-2014-0045591, entitled "APPARATUS FOR DRIVING VOICE COIL MOTOR ACTUATOR," filed on Apr. 16, 2014, which is hereby incorporated by reference in its entirety into this application.

BACKGROUND

1. Field of the Invention

The invention relates to an apparatus for driving a voice coil motor actuator.

2. Description of the Related Art

In a small camera module equipped in mobile devices, such as a cellular phone or a smart phone, an auto focus (AF) function is an essential function for definitely photographing still images or moving pictures. As an actuator for auto focus of the camera module, a voice coil motor (VCM) actuator has been widely used recently and a VCM driving integrated circuit (IC) serves to drive the VCM actuator.

The auto focus function is performed as follows. First, when a position of a lens barrel mounted with a magnet is detected by using a hall sensor and a driving signal is provided to the VCM actuator based on a detected position of the lens barrel and an input target position, a driving force is generated between a coil of the VCM actuator and a magnet mounted in the lens barrel and thus the auto focus function is performed while the position of the lens barrel moves to a focal position.

However, a magnetic force of the magnet within the VCM actuator is changed and thus driving performance of the VCM actuator may be changed, in which the magnetic force of the magnet may be changed depending on the reduction in the magnetic force of the magnet or the change in surrounding temperature and the position of the magnet attached to the lens barrel may be changed by a gravity force depending on a posture of the actuator.

Further, when a focus is searched, a searched focal distance is offset in a predetermined direction by a sensor warpage of the camera module, a tilt of the actuator, and the like and thus a focal position may be biased.

Further, when a driving signal is provided to the actuator by a PWM method at the time of driving the actuator for the auto focus, switching noise occurs and thus noise is included in the driving signal, such that noise may occur or image noise may occur.

Further, with the miniaturization of the camera module, there is a need to minimize a mounting area of the VCM actuator and the apparatus for driving an actuator.

Japanese Patent Document, JP 2013-83597 A describes a position detection apparatus and a position detection method capable of securing high linearity without relying on temperature. However, JP 2013-83597 A does not yet describe or suggest a disposition of a magnetic sensor, a driving coil, and the position detection apparatus for minimizing the mounting area of the VCM actuator and the apparatus for driving an actuator.

Therefore, a need exists for an apparatus for driving a VCM actuator capable of compensating for a deviation in a magnetic force of a magnet due to a change in surrounding temperature and a posture of the actuator, compensating for an offset depending on characteristics of an optical lens and an image sensor, a warpage of the image sensor or a tilt of the actuator, or the like, removing switching noise of an output driver, and having a minimized mounting area.

SUMMARY

Accordingly, embodiments of the invention provide an apparatus for driving a voice coil motor actuator capable of compensating for a deviation in a magnetic force of a magnet due to a change in surrounding temperature and a posture of the actuator, compensating for an offset depending on characteristics of an optical lens and an image sensor, a warpage of the image sensor or a tilt of the actuator, for example, removing switching noise of an output driver, and having a minimized mounting area.

According to an embodiment of the invention, there is provided an apparatus for driving a voice coil motor actuator providing a driving signal to a coil for controlling a position of a lens barrel in which a magnet is equipped. The apparatus includes a plurality of hall sensors detecting the position of the lens barrel in which the magnet is equipped, and a voice coil motor driving integrated circuit providing the driving signal to the coil based on outputs from the plurality of hall sensors and a received target position. According to at least one embodiment, the plurality of hall sensors are embedded in the voice coil motor driving integrated circuit along a moving direction of the magnet.

According to at least one embodiment, a shape of the coil is an oval in which a horizontal diameter is longer than a vertical diameter.

According to another embodiment of the invention, there is provided an apparatus for driving a voice coil motor actuator providing a driving signal to a coil for controlling a position of a lens barrel in which a magnet is equipped. The apparatus includes a plurality of hall sensors detecting the position of the lens barrel in which the magnet is equipped, and a voice coil motor driving integrated circuit providing the driving signal to the coil based on outputs from the plurality of hall sensors and a received target position. According to at least one embodiment, the plurality of hall sensors are embedded in the voice coil motor driving integrated circuit in a minor axis direction of the voice coil motor driving integrated circuit.

According to at least one embodiment, a shape of the coil is an oval in which a horizontal diameter is longer than a vertical diameter.

According to at least one embodiment, the voice coil motor driving integrated circuit is disposed inside the coil in a horizontal direction.

According to at least one embodiment, the plurality of hall sensors are embedded in the voice coil motor driving integrated circuit in parallel with the minor axis direction of the voice coil motor driving integrated circuit.

According to at least one embodiment, a direction in which the plurality of hall sensors are embedded is not orthogonal to the minor axis direction of the voice coil motor driving integrated circuit.

According to at least one embodiment, the voice coil motor driving integrated circuit further includes a hall signal processor processing signals output from a first hall sensor and a second hall sensor and the hall signal processor includes a hall bias spinning unit outputting a difference signal of two output signals of the first hall sensor and a difference signal of two output signals of the second hall sensor, respectively, as a first output signal and a second output signal depending on a hall bias and a clock signal and outputting a difference signal of two biases of the first hall sensor and a difference signal of two biases of the second hall sensor, respectively, as the first output signal and the second output signal, a differential amplification unit differentially amplifying the first output signal and the second output signal output from the hall bias spinning unit, a selection unit outputting a signal output from the differential amplification unit as a third output signal or a fourth output signal depending on the clock signal; a first analog-to-digital converter and a second analog-to-digital converter converting the third output signal and the fourth output signal output from the selector, respectively, into a first digital code and a second digital code, and a control unit dividing the first digital code by the second digital code to output position data.

According to at least one embodiment, the voice coil motor driving integrated circuit moves the lens barrel depending on a position control value input by a user in a process of searching for a focus of a lens and move the lens barrel according to a calculated result after an offset value set by the user is added or subtracted to or from the input position control value at the focused position.

According to at least one embodiment, the voice coil motor driving integrated circuit further includes an analog driving signal output unit for removing switching noise and the analog driving signal output unit includes a first low pass filter receiving a first digital driving signal to remove the switching noise, a first operational amplification unit receiving a signal output from the first low pass filter to output a positive analog driving signal, a second low pass filter connected between an inverting input terminal and an output terminal of the first operational amplification unit, a third low pass filter receiving a second digital driving signal to remove the switching noise, a second operational amplification unit receiving a signal output from the third low pass filter to output a negative analog driving signal, and a fourth low pass filter connected between an inverting input terminal and an output terminal of the second operational amplification unit.

According to still another embodiment of the invention, there is provided an apparatus for driving a voice coil motor actuator providing a driving signal to a coil for controlling a position of a lens barrel in which a magnet is equipped. According to at least one embodiment, the apparatus includes a first hall sensor and a second hall sensor detecting the position of the lens barrel in which the magnet is equipped, and a voice coil motor driving integrated circuit providing a driving signal to the coil based on outputs from the first hall sensor and the second hall sensor and a received target position. According to at least one embodiment, the first hall sensor and the second hall sensor is embedded in the voice coil motor driving integrated circuit in a major axis direction of the voice coil motor driving integrated circuit and the voice coil motor driving integrated circuit is disposed outside the coil.

According to at least one embodiment, a shape of the coil is an oval in which a horizontal diameter is longer than a vertical diameter.

According to at least one embodiment, a direction in which the first hall sensor and the second hall sensor are embedded is not orthogonal to a major axis direction of the voice coil motor driving integrated circuit.

According to at least one embodiment, the voice coil motor driving integrated circuit further includes a hall signal processor processing signals output from the first hall sensor and the second hall sensor and the hall signal processor includes a hall bias spinning unit outputting a difference signal of two output signals of the first hall sensor and a difference signal of two output signals of the second hall sensor, respectively, as a first output signal and a second output signal depending on a hall bias and a clock signal and outputting a difference signal of two biases of the first hall sensor and a difference signal of two biases of the second hall sensor, respectively, as the first output signal and the second output signal, a differential amplification unit differentially amplifying the first output signal and the second output signal output from the hall bias spinning unit, a selection unit outputting a signal output from the differential amplification unit as a third output signal or a fourth output signal depending on the clock signal, a first analog-to-digital converter and a second analog-to-digital converter converting the third output signal and the fourth output signal output from the selector, respectively, into a first digital code and a second digital code, and a control unit dividing the first digital code by the second digital code to output position data.

Various objects, advantages and features of the invention will become apparent from the following description of embodiments with reference to the accompanying drawings.

BRIEF DESCRIPTION OF DRAWINGS

These and other features, aspects, and advantages of the invention are better understood with regard to the following Detailed Description, appended Claims, and accompanying Figures. It is to be noted, however, that the Figures illustrate only various embodiments of the invention and are therefore not to be considered limiting of the invention's scope as it may include other effective embodiments as well.

DETAILED DESCRIPTION

Advantages and features of the invention and methods of accomplishing the same will be apparent by referring to embodiments described below in detail in connection with the accompanying drawings. However, the invention is not limited to the embodiments disclosed below and may be implemented in various different forms. The embodiments are provided only for completing the disclosure of the invention and for fully representing the scope of the invention to those skilled in the art.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the invention. Like reference numerals refer to like elements throughout the specification.

A matter regarding to an operational effect including a technical configuration for an object of a coil unit for a thin film inductor and a manufacturing method thereof and a thin film inductor and a manufacturing method thereof in accordance with embodiments of the invention will be clearly appreciated through the following detailed description with reference to the accompanying drawings showing preferable embodiments of the present invention.

Hereinafter, various embodiments of the invention will be described in detail with reference to the accompanying drawings.

Figure 1:
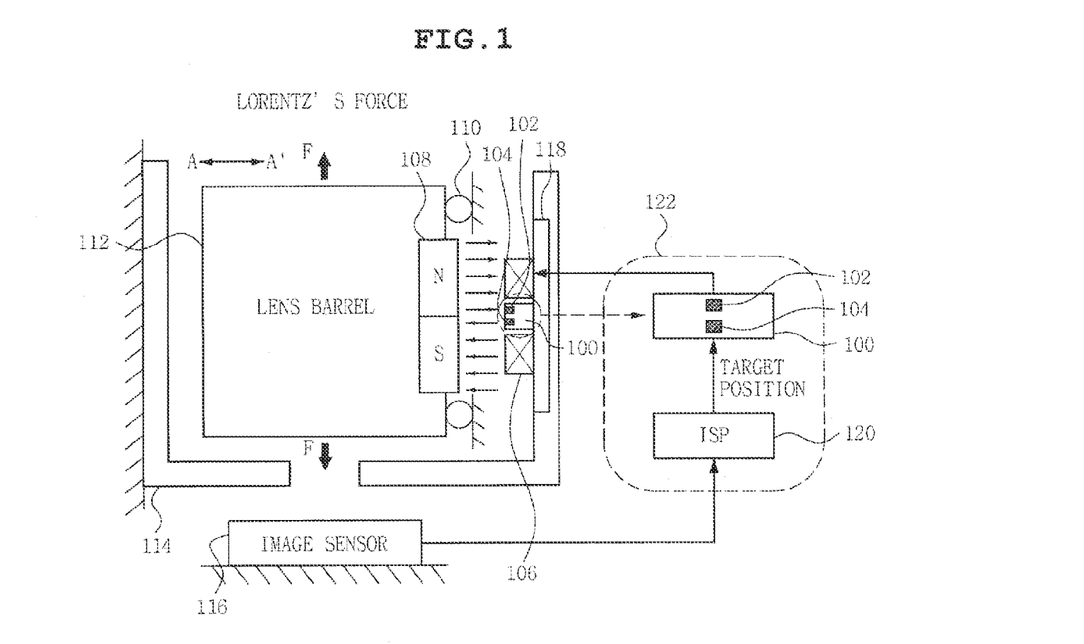
FIG. 1 is a diagram illustrating a camera module of an auto focus function to which an apparatus for driving a voice coil motor actuator according to a first embodiment of the invention.
Figure 2:
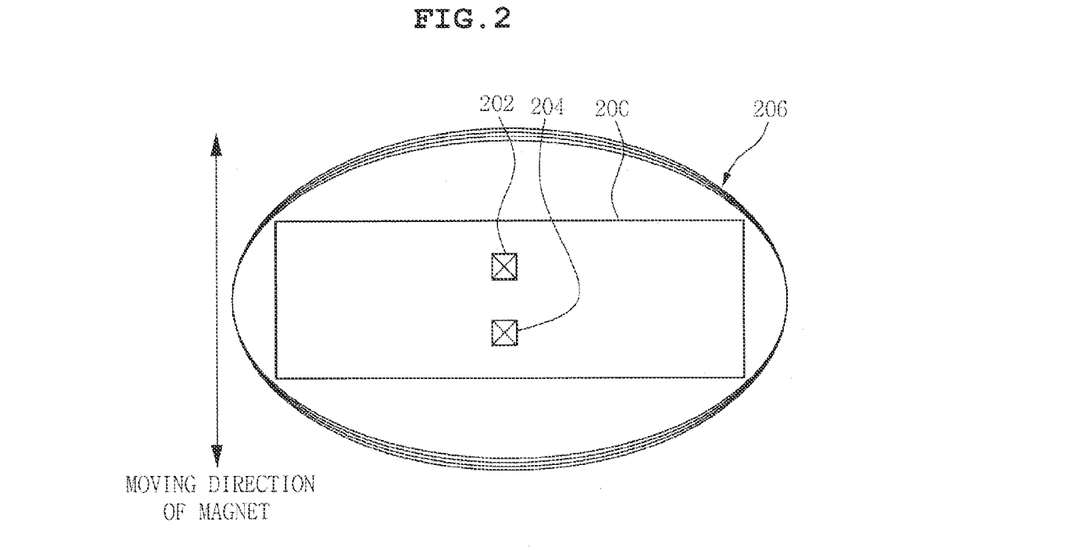
FIG. 2 is a diagram illustrating the apparatus for driving a voice coil motor actuator according to an embodiment of the invention.

FIG. 1 is a diagram illustrating a camera module of an auto focus function to which an apparatus for driving a voice coil motor actuator according to an embodiment of the invention, and FIG. 2 is a diagram illustrating the apparatus for driving a voice coil motor actuator according to another embodiment of the invention.

According to at least one embodiment of the invention, the camera module illustrated in FIG. 1 includes a lens barrel 112 in which a magnet 108 is equipped, a housing 114 for receiving the lens barrel 112, a ball 110 by which the lens barrel 112 moves, a coil 106 disposed in a yoke 118, a voice coil motor driving integrated circuit (IC) 100 horizontally disposed inside the coil 106, and a first hall sensor 102 and a second hall sensor 104 embedded in the voice coil motor driving integrated circuit 100 along a moving direction of the magnet 108.

According to at least one embodiment of the invention, the first hall sensor 102 and the second hall sensor 104 detect a position of the lens barrel 112 in which the magnet 108 is equipped and the voice coil motor driving integrated circuit 100 provides a driving signal to the coil 106 based on a received target position and outputs from the first hall sensor 102 and the second hall sensor 104.

Although this embodiment of the invention illustrates two hall sensors, other embodiments of the invention are not limited thereto and may include a larger number of hall sensors.

According to at least one embodiment of the invention, in a block 122 represented by a dotted line, the voice coil motor driving integrated circuit 100 is a diagram illustrating the voice coil motor driving integrated circuit 100, which is illustrated as a cross-sectional view at the left, viewed from the left, in which the voice coil motor driving integrated circuit 100 at the left is overlappingly illustrated to easily know signal processing at the time of performing an auto focus function.

According to at least one embodiment of the invention, after an image is captured by an image sensor 116 through a lens (not illustrated) of the lens barrel 112, an image signal output from the image sensor 116 is processed by an image signal processor 120 and the voice coil motor driving integrated circuit 100 outputs a driving signal for controlling the position of the lens barrel 112 to the coil 106 based on position data of the lens barrel 112 which are acquired based on target position data output from the image signal processor 120 and output signals from the first hall sensor 102 and the second hall sensor 104, thereby performing an auto focus function.

According to at least one embodiment of the invention, to perform the auto focus function, when the position of the lens barrel 112 is detected using one hall sensor, a deviation in a magnetic force of the magnet 108 which occurs due to the change in the position of the magnet 108 attached to the lens barrel 112 by a gravity force depending on a deviation of a magnetic force of the magnet 108 due to a change in surrounding temperature or a change in a posture of the voice coil motor actuator is not compensated.

For example, even when the magnet 108 attached to the lens barrel 112 moves in a horizontal direction of an arrow represented by AA' by the gravity force due to the change in the posture of the voice coil motor actuator, the magnetic force of the magnet 108 is changed and therefore the change in the magnetic force of the magnet 108 is not differentiated from the change in the magnetic force of the magnet 108 which occurs when the lens barrel 112 moves vertically, such that the position of the lens barrel 112 is not accurately detected.

According to at least one embodiment of the invention, when the position of the lens barrel 112 is not accurately detected, the auto focus function is performed based on the position of the lens barrel 112 and the input target position, such that the auto focus function is not normally performed.

Therefore, the apparatus for driving a voice coil motor actuator according to at least one embodiment of the invention uses two hall sensors of a first hall sensor 202 and a second hall sensor 204 to accurately detect the position of the lens barrel 112.

Further, as illustrated in FIG. 2, the first hall sensor 202 and the second hall sensor 204, according to at least one embodiment, are embedded in the voice coil motor driving integrated circuit 200 in parallel with a minor axis direction of the voice coil motor driving integrated circuit 200, that is, along the moving direction of the magnet 108 (FIG. 1).

In the apparatus for driving a voice coil motor actuator according to an embodiment of the invention, the first hall sensor 202 and the second hall sensor 204 are embedded in parallel with the minor axis direction of the voice coil motor driving integrated circuit 200 and as illustrated in FIG. 2, the voice coil motor driving integrated circuit 200 in which the first hall sensor 202 and the second hall sensor 204 are embedded is horizontally disposed inside the coil 206.

According to at least one embodiment of the invention, when the voice coil motor driving integrated circuit 200 in which the first hall sensor 202 and the second hall sensor 204 are embedded is horizontally disposed inside the coil 206, an area of a flexible printed circuit board (FPCB) on which the coil 206 and the voice coil motor driving integrated circuit 200 are mounted is reduced.

Figure 3:
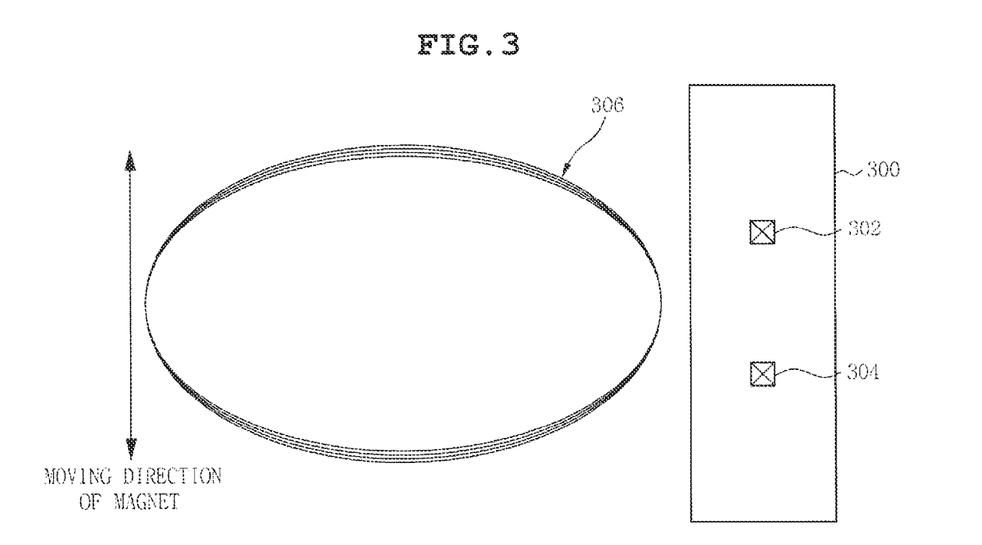
FIG. 3 is a diagram illustrating an apparatus for driving a voice coil motor actuator according to another embodiment of the invention.

However, embodiments of the invention are not limited thereto, and like an apparatus for driving a voice coil motor actuator according to another embodiment of the invention, as illustrated in FIG. 3, a voice coil motor driving integrated circuit 300 in which a first hall sensor 302 and a second hall sensor 304 are embedded is disposed outside a coil in a major axis direction of the voice coil motor driving integrated circuit 300, i.e., along the moving direction of the magnet 108.

According to at least one embodiment of the invention, when the voice coil motor driving integrated circuit 200 in which the first hall sensor 302 and the second hall sensor 304 are embedded is disposed outside the coil 306, the mounting area is slightly more increased than that when the voice coil motor driving integrated circuit 300 are mounted inside the coil 306.

However, even in this case, since the first hall sensor 302 and the second hall sensor 304 are embedded in the voice coil motor driving integrated circuit 300 along the moving direction of the magnet 108, the mounting area is reduced more than that when the hall sensor is disposed outside the voice coil motor driving integrated circuit. Further, the position of the lens barrel 112 is detected by using the two hall sensors 302 and 304, and thus a deviation of the magnetic force in the magnet 108 due to the change in temperature and a difference in the posture is compensated.

Meanwhile, in FIGS. 2 and 3, a shape of the coils 206 and 306 of the voice coil motor actuator is an oval in which a horizontal diameter is longer than a vertical diameter.

According to at least one embodiment of the invention, in the case of the oval in which the horizontal diameter of the coils 206 and 306 of the voice coil motor actuator is longer than the vertical diameter thereof, as illustrated in FIG. 1, a Lorentz's force is generated between the magnet 108 and the coils 206 and 306 to vertically move the lens barrel 112 in FIG. 1.

However, in the case of the oval in which the vertical diameter of the coils 206 and 306 is longer than the horizontal diameter thereof, a direction of current flowing in the coils is changed, and thus the direction of the generated Lorentz's force is changed, such that the magnet 108 is not moved vertically. Therefore, in FIGS. 2 and 3, the shape of the coils 206 and 306 of the voice coil motor actuator needs to be an oval in which a horizontal diameter is longer than a vertical diameter.

According to at least one embodiment of the invention, as illustrated in FIG. 2, the first hall sensor 202 and the second hall sensor 204 are disposed in parallel with the minor axis direction of the voice coil motor driving integrated circuit 200, but the first hall sensor 202 and the second hall sensor 204 are not necessarily disposed in parallel with the minor axis direction of the voice coil motor driving integrated circuit 200 and the first hall sensor 202 and the second hall sensor 204 are disposed in any direction, except for a direction orthogonal to the minor axis direction of the voice coil motor driving integrated circuit 200.

Thus, in FIG. 2, the first hall sensor 202 and the second hall sensor 204 are embedded in the voice coil motor driving integrated circuit 200 along the minor axis direction of the voice coil motor driving integrated circuit 200, so that the direction in which the first hall sensor 202 and the second hall sensor 204 are embedded is not orthogonal to the minor axis direction of the voice coil motor driving integrated circuit 200.

According to at least one embodiment of the invention, as further illustrated in FIG. 2, when the first hall sensor 202 and the second hall sensor 204 are disposed in the direction orthogonal to the minor axis direction of the voice coil motor driving integrated circuit 200 in a line, since the first hall sensor 202 and the second hall sensor 204 sense the magnetic force of the magnet 108 having the same strength in the case in which the magnet 108 moves, similar to the case in which one hall sensor is disposed, it does not differentiate the horizontal movement of the lens barrel 112 from the vertical movement of the lens barrel.

According to at least one embodiment of the invention, as illustrated in FIG. 3, the first hall sensor 302 and the second hall sensor 304 are disposed in parallel with the major axis direction of the voice coil motor driving integrated circuit 300, but the first hall sensor 302 and the second hall sensor 304 are not necessarily disposed in parallel with the major axis direction of the voice coil motor driving integrated circuit 300 and the first hall sensor 302 and the second hall sensor 304 are disposed in any direction, except for a direction orthogonal to the major axis direction of the voice coil motor driving integrated circuit 300.

Figure 4:
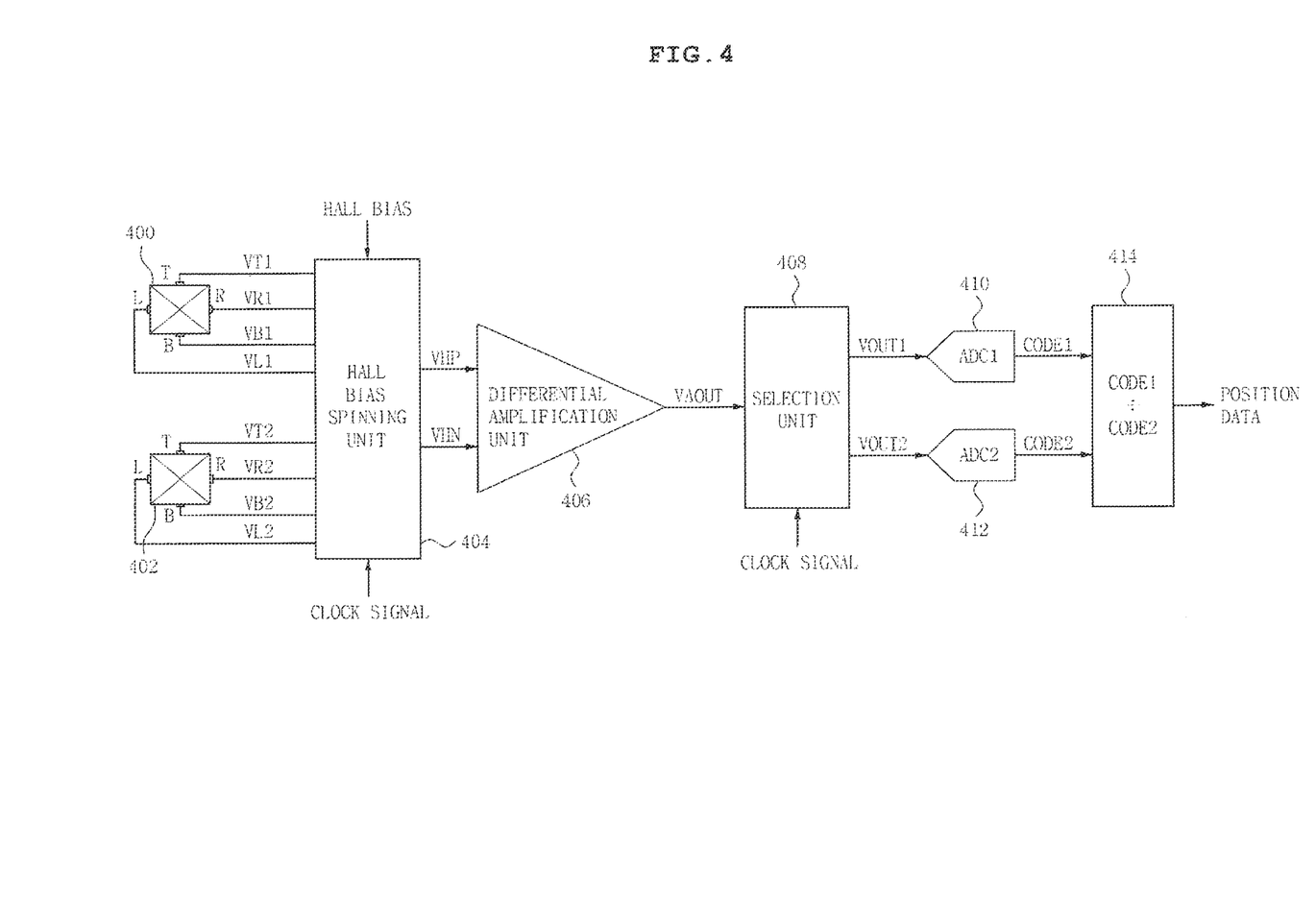
FIG. 4 is a diagram illustrating a hall signal processor included in the apparatus for driving a voice coil motor actuator according to another embodiment of the invention.

FIG. 4 is a diagram illustrating a hall signal processor included in the voice coil motor driving integrated circuits 200 and 300 within the apparatus for driving a voice coil motor actuator according to another embodiment of the invention.

According to at least one embodiment of the invention, the case in which the deviation in the magnetic force of the magnet 108, which is generated due to the change in surrounding temperature and the change in the posture of the actuator is compensated by using a first hall sensor 400 and a second hall sensor 402, will be described with reference to FIG. 4.

According to at least one embodiment of the invention, the hall signal processor included in the apparatus for driving a voice coil motor actuator according to the embodiment of the invention, as illustrated in FIG. 4, includes a hall bias spinning unit 404, which outputs a difference signal VR1-VL1 of two output signals VR1 and VL1 of the first hall sensor 400 and a difference signal VR2-VL2 of two output signals VR2 and VL2 of the second hall sensor 402, respectively, as a first output signal VHP and a second output signal VHN depending on a hall bias and clock signal and outputs a difference signal VT1-VB1 of two biases VT1 and VB1 of the first hall sensor 400 and a difference signal VT2-VB2 of two biases VT2 and VB2, respectively, as the first output signal VHP and the second output signal VHN, a differential amplification unit 406 which differentially amplifies the first output signal VHP and the second output signal VHN output from the hall bias spinning unit 404, a selector 408 which outputs a signal VAOUT output from the differential amplification unit 406 as a third output signal VOUT1 or a fourth output signal VOUT2 depending on the clock signal, a first analog-to-digital converter 410 and a second analog-to-digital converter 412 which convert the third output signal VOUT1 and the fourth output signal VOUT2 output from the selector 408, respectively, as a first digital code CODE1 and a second digital code CODE2, and a control unit 414 which divides the first digital code CODE1 by the second digital code CODE2 to output position data.

According to at least one embodiment of the invention, the first hall sensor 400 receives the two bias signals VT1 and VB1 to output the two hall sensor signals VR1 and VL1 and the second hall sensor 402 receives the two bias signals VT2 and VB2 to output the two hall sensor signals VR2 and VL2.

As illustrated in FIG. 2, the first hall sensor 400 and the second hall sensor 402 are embedded in the voice coil motor driving integrated circuit 200 in the minor axis direction of the voice coil motor driving integrated circuit 200 and the voice coil motor driving integrated circuit 200 is horizontally disposed inside the coil 206. Therefore, the first hall sensor 400 and the second hall sensor 402 are disposed along the moving direction of the magnet 108 (see FIG. 1).

According to at least one embodiment of the invention, the hall bias spinning unit 404 outputs the difference signal VR1-VL1 of the two output signals VR1 and VL1 of the first hall sensor 400 and the difference signal VR2-VL2 of the two output signals VR2 and VL2 of the second hall sensor 402, respectively, as the first output signal VHP and the second output signal VHN at the time of the first operation depending on the hall bias and the clock signal and outputs the difference signal VT1-VB1 of the two biases VT1 and VB1 of the first hall sensor 400 and the difference signal VT2-VB2 of the two biases VT2 and VB2 of the second hall sensor 402, respectively, as the first output signal VHP and the second output signal VHN depending on the hall bias and the clock signal at the time of a second operation.

Meanwhile, even though a role of bias input terminals and hall signal output terminals of the hall sensors 400 and 402 is changed to each other, they perform the same function. Thus, when a bias is applied to the hall signal output terminals of the hall sensors 400 and 402, the hall signals are output from the bias input terminals.

According to at least one embodiment of the invention, the hall bias spinning unit 404 alternately acquires the two output signals (+ and − output signals) and the two biases of the hall sensors from the bias input terminals and the hall signal output terminals of the hall sensors 400 and 402 and subtracts and outputs the acquired two signals to compensate for the offset of the hall sensors 400 and 402.

According to at least one embodiment of the invention, the differential amplification unit 406 differentially amplifies the first output signal VHP and the second output signal VHN output from the hall bias spinning unit 404 to be suited to an input range of the analog-to-digital converters 410 and 412 and the selector 408 outputs the signal output from the differential amplification unit 406 as the third output signal VOUT1 or the fourth output signal VOUT2 depending on the clock signal.

According to at least one embodiment of the invention, the first analog-to-digital converter 410 and the second analog-to-digital converter 412 convert the third output signal VOUT1 and the fourth output signal VOUT2 output from the selector 408, respectively, into the first digital code CODE1 and the second digital code CODE2 and the control unit 414 uses an embedded division function to divide the first digital code CODE1 by the second digital code CODE2 to output data associated with a moving amount of the magnet 108, that is, the position data of the lens barrel 112 in which the magnet 108 is equipped.

Finally, according to at least one embodiment, the output of the control unit 414 is represented by the following Equation 1.

$$\text{Output of control unit} = ((VR1\text{-}VL1)\text{-}(VR2\text{-}VL2)) \times \alpha_1 / ((VT1\text{-}VB1)\text{-}(VT2\text{-}VB2)) \times \alpha_2 \quad \text{[Equation 1]}$$

In the above Equation 1, $\alpha_1$ and $\alpha_2$ represent an amplification factor of the differential amplification unit 406.

As described above, since the data output from the control unit 414 are values obtained by dividing the first digital code CODE1 by the second digital code CODE2, the change in characteristics of the hall sensor due to the change in surrounding temperature and the deviation of the magnetic force of the magnet 108 is compensated.

Further, according to an embodiment of the invention, since the change in the magnetic force of the magnet 108 is sensed by using the two hall sensors 400 and 402, the position of the lens barrel 112 are accurately detected.

For example, even though the position of the magnet 108 attached to the lens barrel 112 is changed by the gravity force depending on the change in the posture of the voice coil motor actuator, and thus the deviation of the magnetic force of the magnet 108 occurs, since the apparatus for driving a voice coil motor actuator according to an embodiment of the invention differentiates the changes in the magnetic force of the magnet 108, when the magnet 108 attached to the lens barrel 112 horizontally moves and when the magnet 108 attached to the lens barrel 112 vertically moves by using the two hall sensors 400 and 402, the position of the lens barrel 112 is accurately detected. Therefore, the deviation of the magnetic force of the magnet 108 occurring due to the change in the position of the magnet 108 by the gravity force depending on the change in the posture of the voice coil motor actuator is compensated.

The control unit 414 of FIG. 4 outputs the values obtained by dividing the first digital code CODE1 by the second digital code CODE2 as the position data, but in some cases, the values obtained by dividing the first digital code CODE1 by the second digital code CODE2 are converted to be suited to calibration results and thus the modified position data is also output.

According to at least one embodiment of the invention, the position data output from the control unit 414 are input to a proportional-integral-derivative (PID) control unit (not illustrated).

According to at least one embodiment of the invention, the PID control unit compares the position data output from the control unit 414 with the received target position data to generate the driving signal to be transmitted to a voice coil motor driver.

Generally, when a user inputs a position control value of the voice coil motor actuator, the voice coil motor driving integrated circuit 200 moves the magnet 108 of the voice coil motor actuator to a position corresponding to the input position control value.

In the case of the voice coil motor having a high pixel, when a slight offset value is added or subtracted to or from a focused position movement input value depending on the characteristics of the optical lens and the image sensor, the offset value which is formed by a tilt component of the optical lens and warpage characteristics of the image sensor is compensated.

According to the apparatus for driving a voice coil motor actuator according to an embodiment of the invention, in a process of searching for the focus of the lens, the lens barrel 112 moves according to a position control value input by the user and the lens barrel 112 moves by moving the magnet 108 of the voice coil motor actuator according to the calculated result after the offset value set by the user is added or subtracted to or from the input position control value at the focused position.

Meanwhile, when the voice coil motor actuator is driven with a digital driving signal, a pulse width modulation (PWM) method is generally used. The PWM method has a simple circuit configuration, and thus has been widely used as a method of driving a voice coil motor actuator.

According to at least one embodiment of the invention, when the voice coil motor actuator is driven by the PWM method, an input voltage of a driving terminal is switched with a signal having a frequency of a power supply voltage and a system ground voltage, and therefore the switching noise is generated. The generated switching noise is a cause of the generation of noise and low light level image noise, when the voice coil motor actuator moves and is maintained.

According to at least one embodiment of the invention, when the voice coil motor actuator is driven by a linear method or an analog method, there is a need for a converter which converts a digital driving signal into an analog signal.

Figure 5:
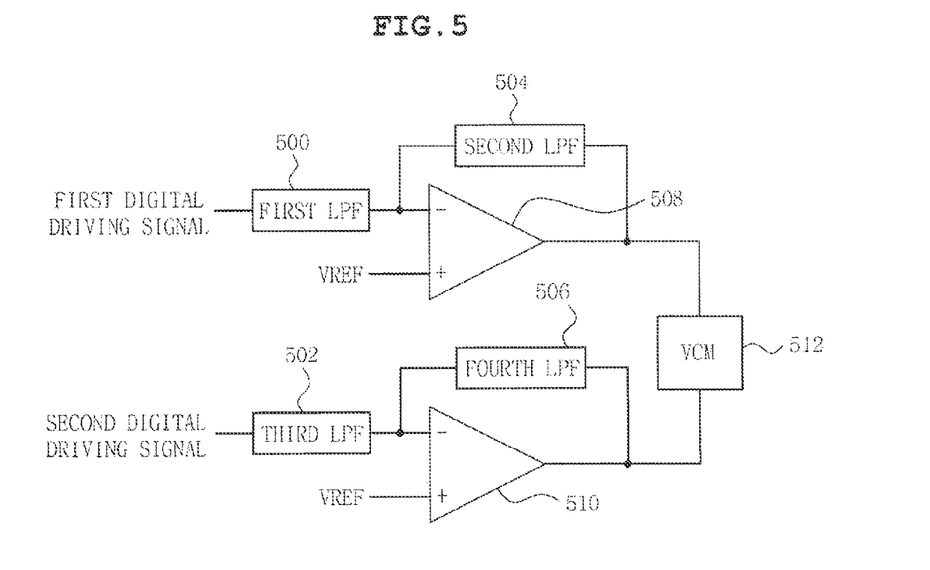
FIG. 5 is a diagram illustrating an analog driving signal output unit for removing switching noise from an actuator driving signal according to another embodiment of the invention.

In the apparatus for driving a voice coil motor actuator according to an embodiment of the invention, the switching noise is removed from the digital actuator driving signal using an analog driving signal output unit illustrated in FIG. 5.

According to at least one embodiment of the invention, the analog driving signal output unit illustrated in FIG. 5 includes a first low pass filter 500 receiving a first digital driving signal (positive digital driving signal) to remove the switching noise, a first operational amplification unit 508 receiving a signal output from the first low pass filter 500 to output a positive analog driving signal, a second low pass filter 504 connected between an inverting input terminal and an output terminal of the first operational amplification unit 508, a third low pass filter 502 receiving a second digital driving signal (negative digital driving signal) to remove the switching noise, a second operational amplification unit 510 receiving a signal output from the third low pass filter 502 to output a negative analog driving signal, and a fourth low pass filter 506 connected between an inverting input terminal and an output terminal of the second operational amplification unit 510. In the above description, the first digital driving signal and the second digital driving signal have an inverting relationship and a reference voltage VREF is applied to non-inverting input terminals of the first operational amplification unit 508 and the second operational amplification unit 510.

According to at least one embodiment of the invention, the switching noise of the first digital driving signal is removed by the first low pass filter 500 and the second low pass filter 504 and the switching noise of the second digital driving signal is removed by the third low pass filter 502 and the fourth low pass filter 506.

According to at least one embodiment of the invention, the first operational amplification unit 508 provides the positive driving current of the voice coil motor actuator and the second operational amplification unit 510 provides the negative driving current of the voice coil motor actuator.

According to at least one embodiment of the invention, the analog driving signal output unit illustrated in FIG. 5 uses the low pass filter and the operational amplification unit to drive the voice coil motor actuator 512 with a low noise and a low image noise.

According to the apparatus for driving a voice coil motor actuator according to an embodiment of the invention, it is possible to accurately detect the position of the lens barrel 112 to precisely perform the auto focus function.

According to the apparatus for driving a voice coil motor actuator according to an embodiment of the invention, two hall sensors are embedded in the voice coil motor driving integrated circuit (IC) and the voice coil motor driving integrated circuit is horizontally disposed inside the coil 206 to be able to minimize the mounting area of the actuator.

Further, according to the apparatus for driving a voice coil motor actuator according to an embodiment of the invention, the change in the magnetic force of the magnet is sensed using the two hall sensors and therefore the deviation of the magnetic force of the magnet due to the change in the surrounding temperature and the posture of the actuator is compensated.

Further, according to the apparatus for driving a voice coil motor actuator according to an embodiment of the invention, at the time of performing the auto focus, the offset value set by the user is added or subtracted to or from the received position moving value and thus the offset due to the characteristics of the optical lens and the image sensor, the warpage of the image sensor, or the tilt of the actuator, or the like is compensated.

Further, according to the apparatus for driving a voice coil motor actuator according to an embodiment of the invention, the switching noise is removed from the digital driving signal using the low pass filter and the operational amplification unit, and thus the noise and the image noise is minimized, when the voice coil motor actuator is driven and maintained, thereby efficiently controlling the voice coil motor actuator.

As set forth above, according to various embodiments of the invention, it is possible to efficiently control the actuator and minimize the mounting area by compensating for the deviation in the magnetic force of the magnet due to the change in the surrounding temperature and the posture of the actuator, compensating for the offset depending on the characteristics of the optical lens and the image sensor, the warpage of the image sensor or the tilt of the actuator, or the like, and removing the switching noise of the output driver.

Terms used herein are provided to explain embodiments, not limiting the invention. Throughout this specification, the singular form includes the plural form unless the context clearly indicates otherwise. When terms "comprises" and/or "comprising" used herein do not preclude existence and addition of another component, step, operation and/or device, in addition to the above-mentioned component, step, operation and/or device.

Embodiments of the invention may suitably comprise, consist or consist essentially of the elements disclosed and may be practiced in the absence of an element not disclosed. For example, it can be recognized by those skilled in the art that certain steps can be combined into a single step.

The terms and words used in the specification and claims should not be interpreted as being limited to typical meanings or dictionary definitions, but should be interpreted as having meanings and concepts relevant to the technical scope of the invention based on the rule according to which an inventor can appropriately define the concept of the term to describe the best method he or she knows for carrying out the invention.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The singular forms "a," "an," and "the" include plural referents, unless the context clearly dictates otherwise.

As used herein and in the appended claims, the words "comprise," "has," and "include" and all grammatical variations thereof are each intended to have an open, non-limiting meaning that does not exclude additional elements or steps.

As used herein, the terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in which the phrase is used. Occurrences of the phrase "according to an embodiment" herein do not necessarily all refer to the same embodiment.

Ranges may be expressed herein as from about one particular value, and/or to about another particular value. When such a range is expressed, it is to be understood that another embodiment is from the one particular value and/or to the other particular value, along with all combinations within said range.

Although the invention has been described in detail, it should be understood that various changes, substitutions, and alterations can be made hereupon without departing from the principle and scope of the invention. Accordingly, the scope of the invention should be determined by the following claims and their appropriate legal equivalents.

What is claimed is:

1. An apparatus for driving a voice coil motor actuator providing a driving signal to a coil for controlling a position of a lens barrel in which a magnet is equipped, the apparatus comprising:
   a plurality of hall sensors configured to detect the position of the lens barrel in which the magnet is equipped; and
   a voice coil motor driving integrated circuit configured to provide the driving signal to the coil based on outputs from the plurality of hall sensors and a received target position,
   wherein the plurality of hall sensors are embedded in the voice coil motor driving integrated circuit along a moving direction of the magnet.

2. The apparatus as set forth in claim 1, wherein a shape of the coil is an oval in which a horizontal diameter is longer than a vertical diameter.

3. An apparatus for driving a voice coil motor actuator providing a driving signal to a coil for controlling a position of a lens barrel in which a magnet is equipped, the apparatus comprising:
   a plurality of hall sensors configured to detect the position of the lens barrel in which the magnet is equipped; and
   a voice coil motor driving integrated circuit configured to provide the driving signal to the coil based on outputs from the plurality of hall sensors and a received target position,
   wherein the plurality of hall sensors are embedded in the voice coil motor driving integrated circuit in a minor axis direction of the voice coil motor driving integrated circuit.

4. The apparatus as set forth in claim 3, wherein a shape of the coil is an oval in which a horizontal diameter is longer than a vertical diameter.

5. The apparatus as set forth in claim 4, wherein the voice coil motor driving integrated circuit is disposed inside the coil in a horizontal direction.

6. The apparatus as set forth in claim 5, wherein the plurality of hall sensors are embedded in the voice coil motor driving integrated circuit in parallel with the minor axis direction of the voice coil motor driving integrated circuit.

7. The apparatus as set forth in claim 3, wherein a direction in which the plurality of hall sensors are embedded is not orthogonal to the minor axis direction of the voice coil motor driving integrated circuit.

8. The apparatus as set forth in claim 3, wherein the voice coil motor driving integrated circuit further comprises a hall signal processor configured to process signals output from a first hall sensor and a second hall sensor, and
   wherein the hall signal processor comprises:
      a hall bias spinning unit configured to output a difference signal of two output signals of the first hall sensor and a difference signal of two output signals of the second hall sensor, respectively, as a first output signal and a second output signal depending on a hall bias and a clock signal and to output a difference signal of two biases of the first hall sensor and a difference signal of two biases of the second hall sensor, respectively, as the first output signal and the second output signal;
      a differential amplification unit configured to differentially amplify the first output signal and the second output signal output from the hall bias spinning unit;
      a selection unit configured to output a signal output from the differential amplification unit as a third output signal or a fourth output signal depending on the clock signal;
      a first analog-to-digital converter and a second analog-to-digital converter configured to convert the third output signal and the fourth output signal output from the selector, respectively, into a first digital code and a second digital code; and
      a control unit configured to divide the first digital code by the second digital code to output position data.

9. The apparatus as set forth in claim 3, wherein the voice coil motor driving integrated circuit is configured to move the lens barrel depending on a position control value input by a user in a process of searching for a focus of a lens and to move the lens barrel according to a calculated result after an offset value set by the user is added or subtracted to or from the input position control value at the focused position.

10. The apparatus as set forth in claim 3, wherein the voice coil motor driving integrated circuit further comprises an analog driving signal output unit for removing switching noise, and
    wherein the analog driving signal output unit comprises:
       a first low pass filter configured to receive a first digital driving signal to remove the switching noise;
       a first operational amplification unit configured to receive a signal output from the first low pass filter to output a positive analog driving signal;
       a second low pass filter connected between an inverting input terminal and an output terminal of the first operational amplification unit;
       a third low pass filter configured to receive a second digital driving signal to remove the switching noise;
       a second operational amplification unit configured to receive a signal output from the third low pass filter to output a negative analog driving signal; and
       a fourth low pass filter connected between an inverting input terminal and an output terminal of the second operational amplification unit.

11. An apparatus for driving a voice coil motor actuator providing a driving signal to a coil for controlling a position of a lens barrel in which a magnet is equipped, the apparatus comprising:
    a first hall sensor and a second hall sensor configured to detect the position of the lens barrel in which the magnet is equipped; and
    a voice coil motor driving integrated circuit configured to provide a driving signal to the coil based on outputs from the first hall sensor and the second hall sensor and a received target position,
    wherein the first hall sensor and the second hall sensor are embedded in the voice coil motor driving integrated circuit in a major axis direction of the voice coil motor driving integrated circuit, and
    wherein the voice coil motor driving integrated circuit is disposed outside the coil.

12. The apparatus as set forth in claim 11, wherein a shape of the coil is an oval in which a horizontal diameter is longer than a vertical diameter.

13. The apparatus as set forth in claim 11, wherein a direction in which the first hall sensor and the second hall sensor are embedded is not orthogonal to a major axis direction of the voice coil motor driving integrated circuit.

14. The apparatus as set forth in claim 11, wherein the voice coil motor driving integrated circuit further comprises a hall signal processor configured to process signals output from the first hall sensor and the second hall sensor, and
    wherein the hall signal processor comprises:
       a hall bias spinning unit configured to output a difference signal of two output signals of the first hall sensor and a difference signal of two output signals of the second hall sensor, respectively, as a first output signal and a second output signal depending on a hall bias and a clock signal and to output a difference signal of two biases of the first hall sensor and a difference signal of two biases of the second hall sensor, respectively, as the first output signal and the second output signal;

a differential amplification unit configured to differentially amplify the first output signal and the second output signal output from the hall bias spinning unit;

a selection unit configured to output a signal output from the differential amplification unit as a third output signal or a fourth output signal depending on the clock signal;

a first analog-to-digital converter and a second analog-to-digital converter configured to convert the third output signal and the fourth output signal output from the selector, respectively, into a first digital code and a second digital code; and a control unit configured to divide the first digital code by the second digital code to output position data.

* * * * *